United States Patent
Kobayashi

(10) Patent No.: US 10,635,072 B2
(45) Date of Patent: Apr. 28, 2020

(54) IMPRINT APPARATUS, METHOD OF CALIBRATING CORRECTION MECHANISM, AND METHOD OF MANUFACTURING ARTICLE

(71) Applicant: CANON KABUSHIKI KAISHA, Tokyo (JP)

(72) Inventor: Kenichi Kobayashi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 445 days.

(21) Appl. No.: 14/943,079

(22) Filed: Nov. 17, 2015

(65) Prior Publication Data
US 2016/0144553 A1    May 26, 2016

(30) Foreign Application Priority Data
Nov. 20, 2014  (JP) ................... 2014-235282

(51) Int. Cl.
G05B 19/18    (2006.01)
B29C 33/38    (2006.01)
B29K 101/10   (2006.01)
B29L 31/34    (2006.01)

(52) U.S. Cl.
CPC ........ G05B 19/182 (2013.01); *B29C 33/3835* (2013.01); *B29K 2101/10* (2013.01); *B29L 2031/34* (2013.01); *G05B 2219/35044* (2013.01); *G05B 2219/45244* (2013.01)

(58) Field of Classification Search
None
See application file for complete search history.

(56) References Cited

U.S. PATENT DOCUMENTS

| 7,535,549 B2 | 5/2009 | Cherala et al. |
| 8,579,625 B2 | 11/2013 | Kruijt-Stegeman et al. |
| 2005/0006343 A1* | 1/2005 | Choi ............. B29C 43/003 216/59 |
| 2005/0271955 A1* | 12/2005 | Cherala ............. B82Y 10/00 430/22 |
| 2009/0108484 A1* | 4/2009 | Kruijt-Stegeman ... B82Y 10/00 264/40.5 |

(Continued)

FOREIGN PATENT DOCUMENTS

| JP | 2009141328 A | 6/2009 |
| JP | 4573873 B2 | 11/2010 |
| JP | WO 2013118547 A1 * | 8/2013 ........ G03F 7/0002 |

*Primary Examiner* — Rocio Del Mar Perez-Velez
*Assistant Examiner* — Hung H Dang
(74) *Attorney, Agent, or Firm* — Rossi, Kimms & McDowell LLP

(57) ABSTRACT

An imprint apparatus includes a mold holding unit configured to hold a mold, a correction mechanism configured to correct a shape of a pattern formed in the mold to a desired shape by applying a force to the mold held in the mold holding unit, and a controller configured to assume a plurality of mold pattern shapes for a specific mold, calculate a parameter for associating the plurality of assumed mold pattern shapes and a deformation amount of the specific mold by causing the correction mechanism to apply the force to the specific mold to obtain the deformation amount of the specific mold so that the plurality of assumed mold pattern shapes are formed, and calibrate the correction mechanism using the parameter.

10 Claims, 5 Drawing Sheets

(56) References Cited

U.S. PATENT DOCUMENTS

| | | | |
|---|---|---|---|
| 2013/0134630 A1* | 5/2013 | Miyata | B29C 59/02 264/293 |
| 2013/0300031 A1* | 11/2013 | Torii | G03F 7/0002 264/293 |
| 2016/0041058 A1* | 2/2016 | Georgin | G01L 25/00 702/98 |
| 2016/0070179 A1* | 3/2016 | Op 'T Root | G03F 7/70025 355/67 |

* cited by examiner

IMPRINT APPARATUS, METHOD OF CALIBRATING CORRECTION MECHANISM, AND METHOD OF MANUFACTURING ARTICLE

BACKGROUND OF THE INVENTION

Field of the Invention

The present invention relates to an imprint apparatus, a method of calibrating a correction mechanism, and a method of manufacturing an article.

Description of the Related Art

There is microfabrication technology for forming a pattern on a substrate according to an imprint process of molding an imprint material on the substrate according to a mold. This technology is also referred to as imprint technology and enables a pattern (structure) on the order of several nanometers to be formed on the substrate. For example, one type of imprint technology is a photocuring method. In an imprint apparatus adopting the photocuring method, first, a photocurable resin is supplied as an imprint material to a shot region on the substrate. Next, the resin on the substrate is molded using the mold. Then, the resin is cured by radiating light and released to form a pattern of the resin on the substrate. In the imprint technology, for example, there is a thermosetting method for curing a resin according to heat in addition to the photocuring method.

However, in an imprint apparatus adopting the above-described technology, a pattern shape error such as magnification, skew, or a trapezoid occurring in a semiconductor process may be included. Thus, when a base layer (base pattern) formed on the substrate in advance and a concave-convex pattern (pattern region) formed in a mold are superimposed, relative positions of a mark formed in the mold and a mark formed on the substrate are first measured using a detector. Next, the relative positions are corrected by deforming the mold based on a relative position difference. Here, a shape correction apparatus for deforming the mold at a precision of several nanometers or less is required to perform the superimposition of the pattern at high precision.

Therefore, Japanese Patent Laid-Open No. 2009-141328 discloses a shape correction apparatus in which an actuator for applying a compressive force to a side surface of a mold is disposed between the side surface of the mold and a support structure, the compressive force is measured using a force sensor installed between the actuator and the support structure, and feedback is controlled. In addition, the publication of Japanese Patent No. 4573873 discloses a method of obtaining a deformation parameter predicted to occur in a mold to minimize a dimension change between a record pattern on a mold and a reference pattern.

However, in a force sensor such as a load cell or a strain gauge for general use as disclosed in Japanese Patent Laid-Open No. 2009-141328, error sensitivity for an environmental change in temperature or humidity is high and a measurement error due to an offset or a gain change is likely to occur. In addition, because there is also a possibility of a measurement error occurring due to changes over time of an adhesive to be used when the strain gauge or the like is attached, it is difficult to maintain stable precision.

On the other hand, as disclosed in the publication of Japanese Patent No. 4573873, it is possible to correct a mold to a desired shape by measuring a plurality of marks at the time of alignment even when a sensor measurement error occurs. However, because it is difficult to correct the shape of the mold according to a command when the correction is affected by the sensor measurement error, the number of iterations of measurement increases until the residual converges and there is a possibility of the degradation of throughput.

SUMMARY OF THE INVENTION

The present invention, for example, provides an imprint apparatus that is useful for changing a mold to a desired shape at a high precision and a high speed.

According to the present invention, an imprint apparatus for forming a pattern of an imprint material on a substrate using a mold includes a mold holding unit configured to hold the mold; a correction mechanism configured to correct a shape of a pattern formed in the mold to a desired shape by applying a force to the mold held in the mold holding unit; and a controller configured to assume a plurality of mold pattern shapes for a specific mold, calculate a parameter for associating the plurality of assumed mold pattern shapes and a deformation amount of the specific mold by causing the correction mechanism to apply the force to the specific mold to obtain the deformation amount of the specific mold so that the plurality of assumed mold pattern shapes are formed, and calibrate the correction mechanism using the parameter.

Further features of the present invention will become apparent from the following description of exemplary embodiments (with reference to the attached drawings).

DESCRIPTION OF THE EMBODIMENTS

Hereinafter, embodiments of the present invention will be described with reference to the drawings, etc.
(First Embodiment)

Figure 1:
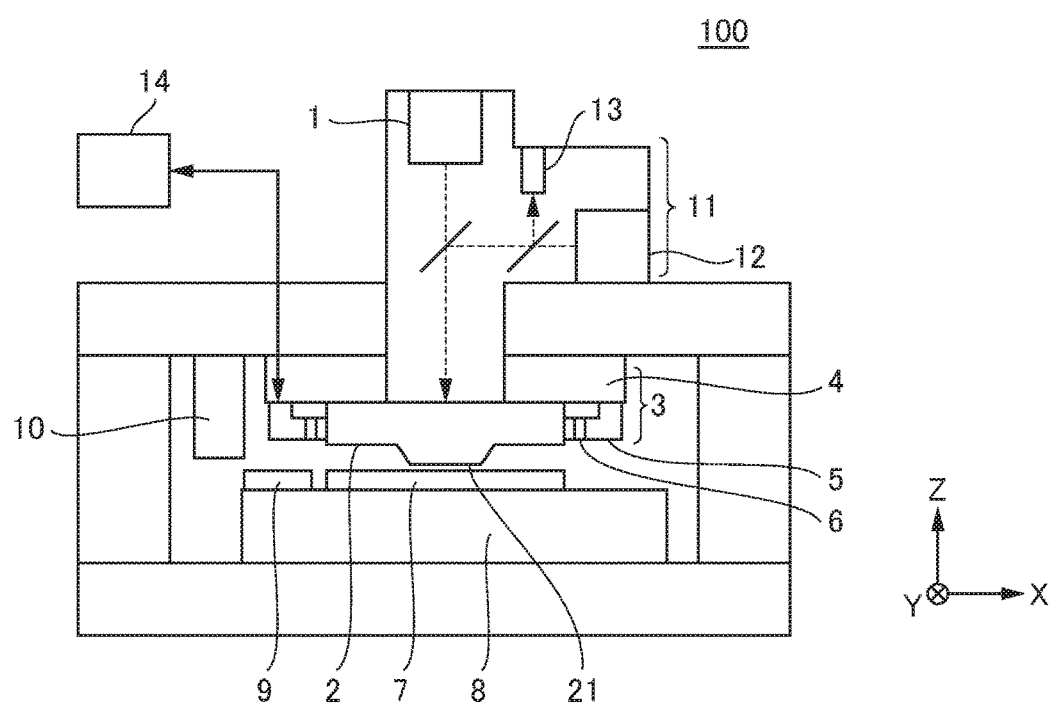
FIG. 1 is a diagram illustrating a configuration of an imprint apparatus according to an embodiment of the present invention.

First, an imprint apparatus according to the first embodiment of the present invention will be described. FIG. 1 is a schematic diagram illustrating a configuration of the imprint apparatus 100 according to the embodiment of the present invention. The imprint apparatus 100 is used to manufacture a semiconductor device or the like serving as an article, molds an uncured resin (imprint material) coated on a wafer 7 (on a substrate) and a mold 2 by bringing the uncured resin and the mold 2 in contact with each other, and forms a pattern of a resin on the wafer 7. Also, the imprint apparatus 100, for example, is assumed to adopt a photocuring method. In addition, in the following drawings, a Z axis is defined as an upward/downward direction (vertical direction) and X and Y axes orthogonal to each other within a plane perpendicular to the Z axis are defined. The imprint apparatus 100 includes an illumination system 1, a mold holding mechanism 3, a wafer stage 8, a coating unit 10, an alignment measuring unit 11, and a controller 14.

The illumination system 1 is a resin curing means for adjusting ultraviolet light emitted from a light source (not illustrated) to light suitable for curing the resin and radiating the light to the mold 2. The light source is not limited to the ultraviolet light and it is only necessary that it emit light of a wavelength which is transmitted through the mold 2 and at which the resin is cured. Also, for example, when the thermosetting method is adopted, a heating means for curing a thermosetting resin is installed in the vicinity of the wafer stage 8 as a resin curing means in place of the illumination system 1.

The mold 2 is a mold in which a plane shape is a rectangle and which has a concave-convex pattern (pattern region) 21 such as a circuit pattern three-dimensionally formed in the center of a surface opposed to the wafer 7. The material of the mold 2 is a material such as quartz capable of transmitting ultraviolet light. The surface of the concave-convex pattern 21 is processed at a high degree of flatness. In addition, the mold 2 has a plurality of alignment marks 22 in a perimeter region of the concave-convex pattern 21 (see FIG. 2). Plane coordinates of each of the plurality of alignment marks 22 are measured in advance and saved as coordinate data including a drawing error when a mark is formed, for example, in a storage apparatus included in the controller 14, within the imprint apparatus 100.

The mold holding mechanism (mold holding unit) 3 has a mold chuck 4 for holding the mold 2, a mold driving mechanism (not illustrated) for supporting and moving the mold chuck 4, and a shape correction mechanism 5 capable of deforming the concave-convex pattern 21 (mold 2). The mold chuck (mold base) 4 holds the mold 2 by attracting an outer circumferential region of an irradiation surface of the ultraviolet light in the mold 2 according to a vacuum suction force or electrostatic force. In addition, the mold chuck 4 and the mold driving mechanism have an opening region in a center (inner side) so that the ultraviolet light radiated from the illumination system 1 is transmitted through the mold 2 and directed to the wafer 7. The mold driving mechanism moves the mold 2 in a Z-axis direction to selectively bring the mold 2 and the resin on the wafer 7 in contact with each other or separate them from each other. Also, the contact or separation operation at the time of an imprint process may be implemented by moving the mold 2 in the Z-axis direction. In addition, the contact or separation operation may be implemented by driving the wafer stage 8 and moving the wafer 7 in the Z-axis direction or both the mold 2 and the wafer 7 may be relatively moved. The shape correction mechanism (correction mechanism) 5 corrects the shape of the concave-convex pattern 21 to a desired shape by applying a force (external force or compressive force) to the mold 2 held in the mold chuck 4 and changing the shape of the mold 2.

Figure 2:
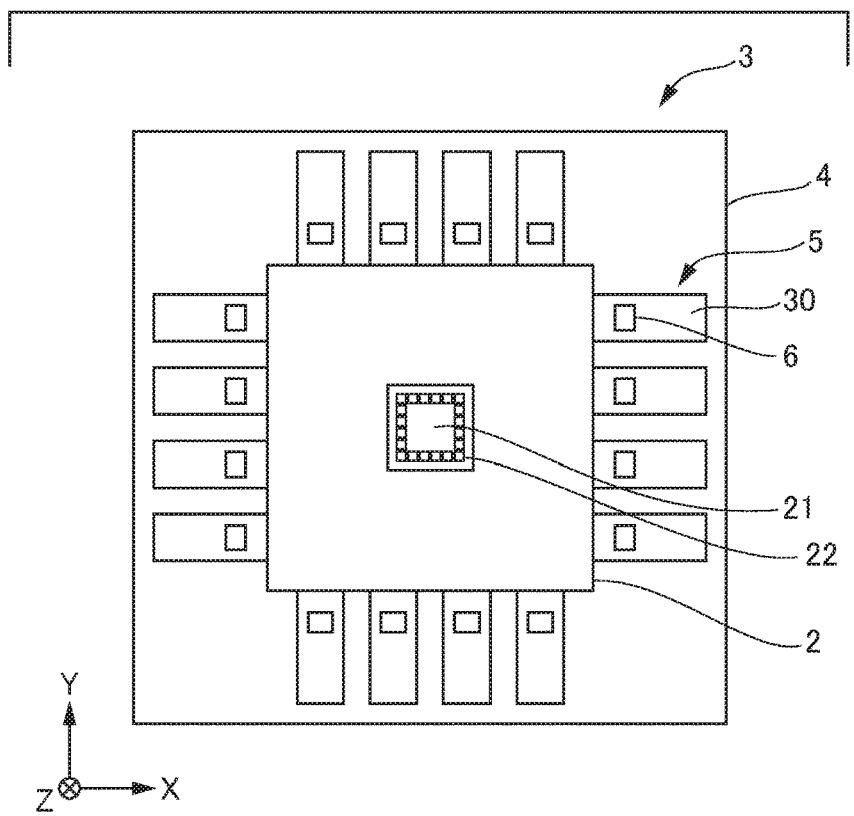
FIG. 2 is a diagram illustrating a configuration of a shape correction mechanism.

FIG. 2 is a schematic plan view illustrating a configuration of the shape correction mechanism 5 when viewed from a negative side of the Z-axis direction (the side of the wafer stage 8). The shape correction mechanism 5 has a plurality of driving units 30 opposed to any of side surfaces (surfaces XZ surfaces or YZ surfaces) perpendicular to the XY surface in which the concave-convex pattern 21 is formed) of four directions of the mold 2 and disposed to surround the entire side surface corresponding to an outer circumferential portion of the mold 2. Also, in the shape correction mechanism 5 illustrated in FIG. 2, for example, four driving units 30 are assumed to be disposed for each side surface (one side) of one direction of the mold 2. Each driving unit 30 is supported by the mold chuck 4 and includes an actuator for generating a compressive force to the side surface of the mold 2 and a sensor (detector) 6 for measuring the compressive force applied to the side surface of the mold 2. As the actuator, a piezoelectric actuator having a small heating value and excellent responsiveness can be adopted. The driving unit 30 has a driving stroke necessary to generate a desired compressive force and a driving stroke including a predetermined idle running distance in which a non-contact state is provided for the mold 2. The sensor 6 is a force sensor such as a load cell or a strain gauge individually continuously provided in each of a plurality of driving units 30. Also, as the sensor 6, a non-contact displacement sensor supported by the mold chuck 4 may be designated as another compressive force measuring means and detect a relative position of the side surface of the mold 2 may be provided.

The wafer 7, for example, is a processed substrate including single crystal silicon. Also, when the substrate is used to manufacture an article other than a semiconductor device, for example, optical glass such as quartz can be adopted as the material of the substrate if an optical element is manufactured and GaN, SiC, or the like can be adopted as the material of the substrate if a light-emitting element is manufactured.

The wafer stage (substrate holding unit) 8 is capable of moving within the XY plane while holding the wafer 7 and performs position alignment of the mold 2 and the wafer 7 when in contact with the mold 2 and the resin on the wafer 7. In addition, the wafer stage 8 has a reference mark 9 for aligning the mold 2 and the wafer stage 8.

Figure 3:
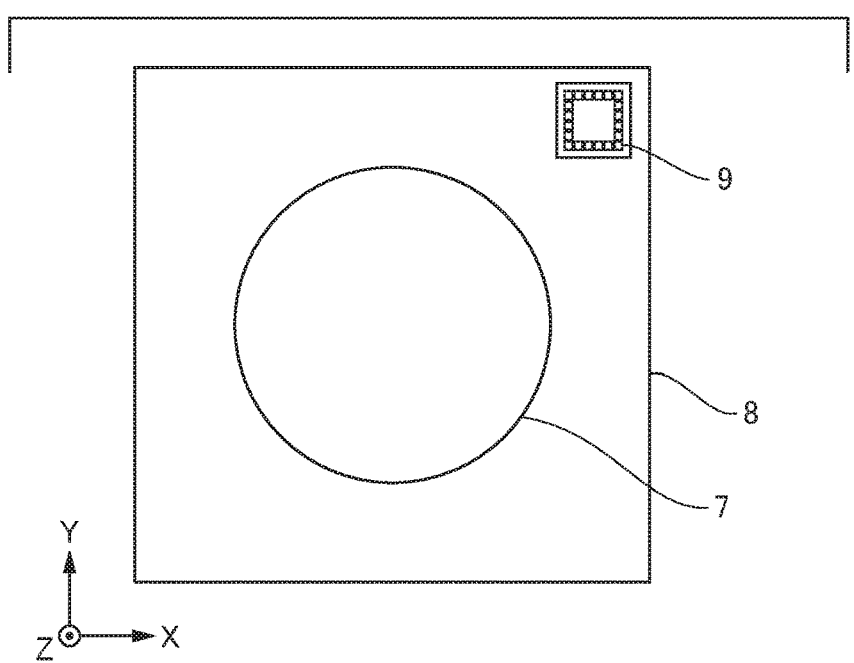
FIG. 3 is a diagram illustrating a configuration of a wafer stage.

FIG. 3 is a schematic plan view illustrating shapes and installation positions of the wafer stage 8 and the reference mark 9 when viewed from a positive side of the Z-axis direction (the side of the mold holding mechanism 3). A plurality of reference marks 9 are provided to be symmetrical with respect to a plurality of alignment marks 22 (see FIG. 2) installed (formed) in the mold 2. In addition, plane coordinates of each of the plurality of reference marks 9 are measured in advance and saved as coordinate data including a drawing error at the mark formation time, for example, in a storage apparatus included in the controller 14, within the imprint apparatus 100.

The coating unit (dispenser) 10 coats an uncured resin in a desired coating pattern on a shot region (pattern formation region) preset on the wafer 7. The resin serving as the imprint material has mobility when filled between the mold 2 and the wafer 7 and a solid for maintaining a shape after molding is required. In particular, in this embodiment, the resin is an ultraviolet curable resin (photocurable resin) having a property of being cured by receiving ultraviolet light, but a thermosetting resin, a thermoplastic resin, or the like can be used in place of the photocurable resin according to various types of conditions such as article manufacturing processes.

The alignment measuring unit 11 includes a measurement light source 12 for use in a wavelength band in which no resin is cured such as a He—Ne laser, a detector 13 such as a charge coupled device (CCD) camera, and an optical element (not illustrated). The alignment measuring unit 11 radiates measurement light in a state in which the alignment mark 22 and the alignment mark on the wafer 7 overlap when the concave-convex pattern 21 and the base layer (base pattern) formed in advance on the wafer 7 are superimposed and the detector 13 detects an interference fringe. Thereby, the alignment measuring unit 11 can measure relative positions of the alignment mark 22 of the mold 2 and the alignment mark of the wafer 7. Likewise, the alignment measuring unit 11 can detect the alignment mark 22 of the mold 2 and the reference mark 9 installed on the wafer stage 8. Further, based on a detection result, it is possible to measure relative positions of the alignment mark 22 (mold 2) and the reference mark 9 (wafer stage 8).

The controller 14, for example, includes a computer or the like, is connected to each component of the imprint apparatus 100 via a line, and can control an operation, adjustment, or the like of each component according to a program or the like. In particular, in this embodiment, the controller 14 can perform control related to calibration of the shape correction mechanism 5 as follows. Also, the controller 14 may be configured to be integrated with another part of the imprint apparatus 100 (within a common housing) or configured to be separated from another part of the imprint apparatus 100 (within a separate housing).

Next, shape correction of the concave-convex pattern 21 formed in the mold 2 will be described. First, the controller 14 superimposes the alignment mark of the base layer formed in advance on the wafer 7 and the alignment mark 22 of the mold 2 and causes the alignment measuring unit 11 to measure mutually relative positions of the marks. Here, a relation between alignment precision and a measurement time becomes the trade-off according to the number of alignment marks 22 to be measured. Therefore, the controller 14 selects the alignment mark 22 to be measured from among a plurality of alignment marks 22 according to use conditions of the imprint apparatus 100. Next, the controller 14 calculates a shape error of the concave-convex pattern 21 from information related to the relative positions obtained by the alignment measurement and obtains a shape correction amount decomposed into a shape component such as magnification, skew, a trapezoid, a bow shape, or a spool shape. In this manner, it is possible to obtain a shape difference between a pattern region of the mold 2 and an imprint region formed in the wafer 7 from a result of detecting the alignment mark. Next, the controller 14 derives a compressive force input to each driving unit 30 by applying the obtained shape correction amount to Formula (1) and performs shape correction by adding the derived compressive force to a target value (compressive force or displacement) of a control system of each driving unit 30.

$$\begin{bmatrix} f_1 \\ \vdots \\ f_m \end{bmatrix} = [A] \times \begin{bmatrix} r_1 \\ \vdots \\ r_n \end{bmatrix} \quad \text{Formula (1)}$$

However, a matrix [r] is a deformation amount (shape correction amount) including elements of n shape components. A matrix [f] is a target value (compressive force) for a feedback control system of each driving unit 30 including m elements corresponding to the number of axes of the driving unit 30. In addition, a matrix [A] is a matrix which includes m×n elements and determines a target value [f] from a deformation amount [r].

Here, the matrix [A] is a parameter determined according to the shape of the mold 2, Young's modulus and Poisson's ratio of the material, a friction force at the time of suction holding of the mold 2, etc., and is obtained through simulation in advance. Specifically, first, the controller 14 obtains the deformation amount [r] of the concave-convex pattern 21 when the compressive force corresponding to the target value [f] is applied to the side surface of the mold 2 using a known technique such as finite element analysis (FEA). Next, the controller 14 iterates this process while sequentially changing a plurality of types of compressive forces (target values [f]) assumed in advance. Then, the controller 14 calculates the matrix [A] using a least squares method or the like from elements {[r]} of a matrix of a deformation amount obtained through the simulation and elements {[f]} of a matrix of a plurality of types of target values assumed in advance. Also, Formula (1) corresponds to simultaneous linear equations, but the order may be increased by further developing Formula (1) to precisely perform shape correction.

Then, the controller 14 can finally perform desired superimposition by iteratively performing alignment measurement and shape correction until a shape error converges in an allowed range.

Next, initial calibration will be described as a method of calibrating the shape correction mechanism 5. The matrix [A] in the above-described Formula (1) is obtained through the simulation, and thus there is a possibility of occurrence of an error if the matrix [A] is directly applied to the shape correction mechanism 5. This error results from a dimension error of the mold 2, a processing/assembly error of the shape correction mechanism 5, a measurement error of the sensor 6, or the like. Therefore, in this embodiment, initial calibration of the shape correction mechanism 5 is performed as described below to implement more precise shape correction.

Figure 4:
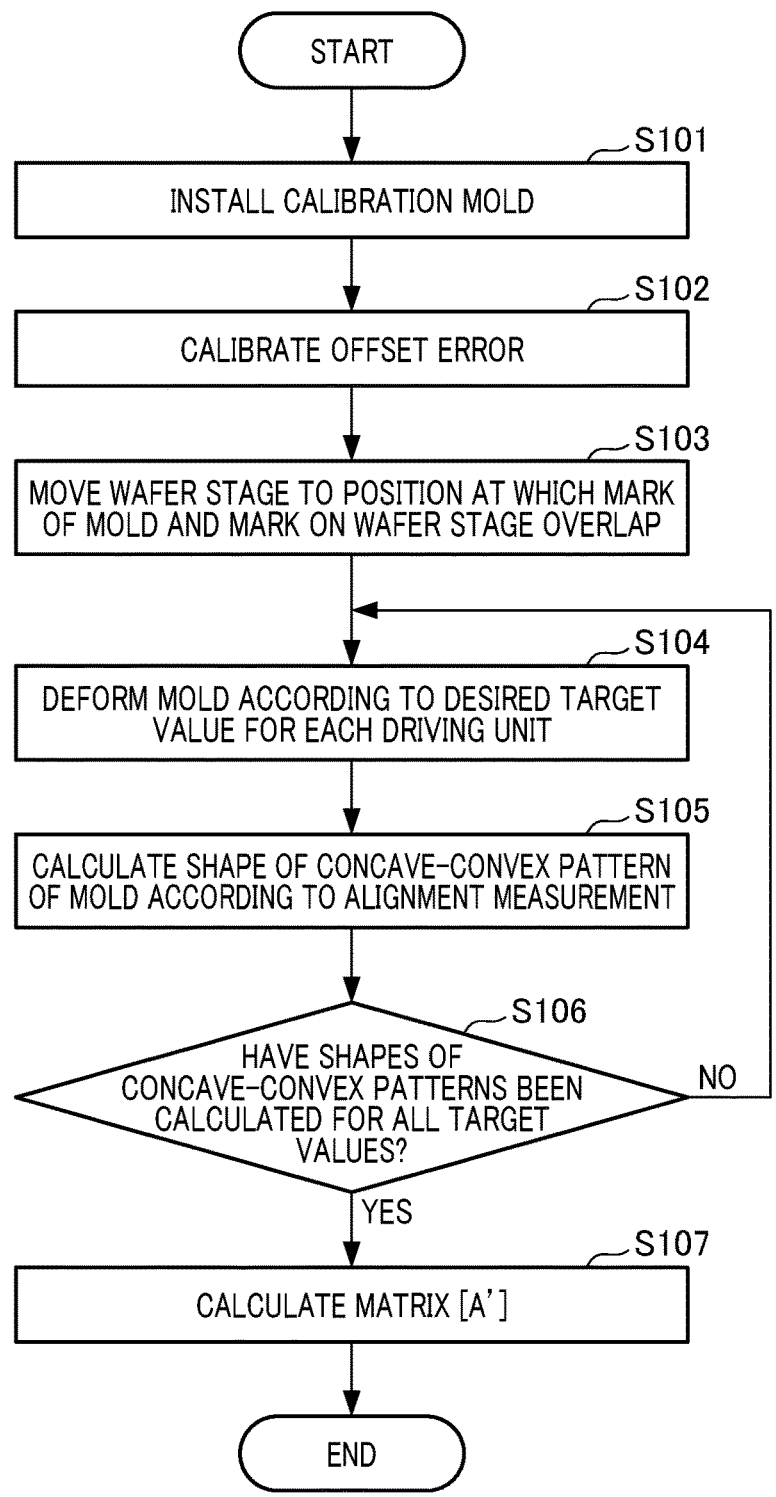
FIG. 4 is a flowchart illustrating a flow of initial calibration of a shape correction mechanism.

FIG. 4 is a flowchart illustrating a flow of an initial calibration process of the shape correction mechanism 5. First, when the controller 14 starts the initial calibration process, a mold (calibration mold) to be used to perform calibration different from the mold (production mold) to be used in actual production is set as the mold 2 and installed in the mold holding mechanism 3 (setting process: step S101). It is desirable that the calibration mold be constantly provided within the imprint apparatus 100 and the calibration mold be appropriately automatically conveyed with the mold holding mechanism 3 based on a conveyance command from the controller 14.

Next, the controller 14 calibrates an offset error of the sensor 6 (step S102). Each driving unit 30 included in the shape correction mechanism 5 is movable by a given stroke in a non-contact state with the mold 2. Therefore, here, the controller 14 first drives the driving unit 30 until all the driving units 30 are in the non-contact state. In this non-contact state, the mold 2 is held in only an absorption force by the mold chuck 4 and the compressive force for the side surface of the mold 2 is not generated. Accordingly, at this time, it is desirable that the measured value of each sensor 6 be zero or match a predetermined reference value. Based on this, the controller 14 designates the measured value of each sensor 6 or a difference from the reference value as an offset error and processes a result obtained by adding the offset error to an actually measured value (output value) as a measured value. Also, the information related to the offset error is saved, for example, in the storage apparatus included in the controller 14, within the imprint apparatus 100.

Next, the controller 14 moves the wafer stage 8 to the measurement position for performing alignment measurement in the following step S105 by superimposing the alignment mark 22 of the mold 2 and the reference mark 9 installed on the wafer stage 8 (step S103). In addition, the controller 14 lowers the mold chuck 4 so that the alignment mark 22 and the reference mark 9 are close to the mold driving mechanism. Also, in order to perform initial calibration in a state close to a state of an actual imprint process, a resin or a fluid other than a resin may be coated on the reference mark 9 in advance.

Next, the controller 14 inputs elements {[f]} of a matrix of a predetermined desired target value (driving command)

to each driving unit 30 and deforms the concave-convex pattern 21 of the mold 2 (step S104).

Next, the controller 14 causes the alignment measuring unit 11 to perform alignment measurement and calculates the shape of the concave-convex pattern 21 of the mold 2, that is, elements {[r]} of a matrix of an actual deformation amount of the concave-convex pattern 21, based on a measurement result (deformation amount derivation process: step S105).

Next, the controller 14 determines whether the elements {[r]} of the matrix of the actual deformation amount are obtained for the elements {[f]} of the matrix of all the target values (step S106). Here, when it is determined that the elements {[r]} are not obtained (No), the controller 14 iterates the process of steps S104 and S105. On the other hand, the controller 14 proceeds to the following step S107 when the elements {[r]} are obtained (Yes).

Then, the controller 14 calculates a matrix [A'] for associating the elements {[r]} of the matrix of the actual deformation amount and the elements {[f]} of the matrix of the target values (calculation process: step S107). Here, the matrix [A'] is calculated using a least squares method as in the case in which the matrix [A] in Formula (1) is obtained.

Hereinafter, when the calibration mold is used, it is only necessary for the controller 14 to perform shape correction using Formula (2) to which the matrix [A'] obtained in step S107 is applied as a calibration process.

$$\begin{bmatrix} f_1 \\ \vdots \\ f_m \end{bmatrix} = [A'] \times \begin{bmatrix} r_1 \\ \vdots \\ r_n \end{bmatrix} \quad \text{Formula (2)}$$

In this manner, when the calibration of the shape correction mechanism 5 in the imprint apparatus 100 is performed, the matrix [A'] which is a parameter obtained using the calibration mold is used. Therefore, because it is only necessary to use a parameter obtained in advance while installing the calibration mold at the time of subsequent calibration, it is possible to perform calibration at a high speed without having to obtain a parameter for calibration again. In addition, the parameter for use in the calibration is not obtained by simulation, but is obtained by actual measurement. Accordingly, for example, it is possible to perform highly precise calibration because a parameter reflecting the measurement error is used even when a measurement error occurs in the sensor 6.

As described above, according to this embodiment, it is possible to provide an imprint apparatus and an imprint method that are useful for stably changing the concave-convex pattern formed in the mold to a desired shape at a high precision and a high speed.

(Second Embodiment)

Next, the imprint apparatus according to the second embodiment of the present invention will be described. In the first embodiment, an example in which initial calibration is particularly performed in relation to calibration of the shape correction mechanism 5 was shown. Meanwhile, the imprint apparatus according to this embodiment is characterized in that the imprint apparatus can be applied to calibration for changes with time, that is, the case in which the calibration is performed at a desired time interval in relation to a calibration method of the shape correction mechanism 5. Also, because each component of the imprint apparatus according to this embodiment is the same as each component of the imprint apparatus 100 according to the first embodiment, the same reference signs are assigned to the same components and description thereof will be omitted.

A main factor of the changes with time of the shape correction mechanism 5 includes a measurement error of the sensor 6. The measurement error of the sensor 6 is classified into a linearity error and an offset error. In particular, when a function of the linearity error is generated, a high-order approximation function may be used. However, for simplification of description, only a linear gain error will be mentioned.

Here, a matrix [f'] which is an actual compression amount for a matrix [f] of a target value of each driving unit calculated using the above-described Formula (1) is expressed by Formula (3).

$$\begin{bmatrix} f'_1 \\ \vdots \\ f'_m \end{bmatrix} = \begin{bmatrix} f_1 \\ \vdots \\ f_m \end{bmatrix} \times \begin{bmatrix} gain_1 \\ \vdots \\ gain_m \end{bmatrix} + \begin{bmatrix} ofs_1 \\ \vdots \\ ofs_m \end{bmatrix} \quad \text{Formula (3)}$$

However, a matrix [gain] is a gain error of each sensor 6 including m elements. In addition, a matrix [ofs] is an offset error of each sensor 6 including m elements.

Figure 5:
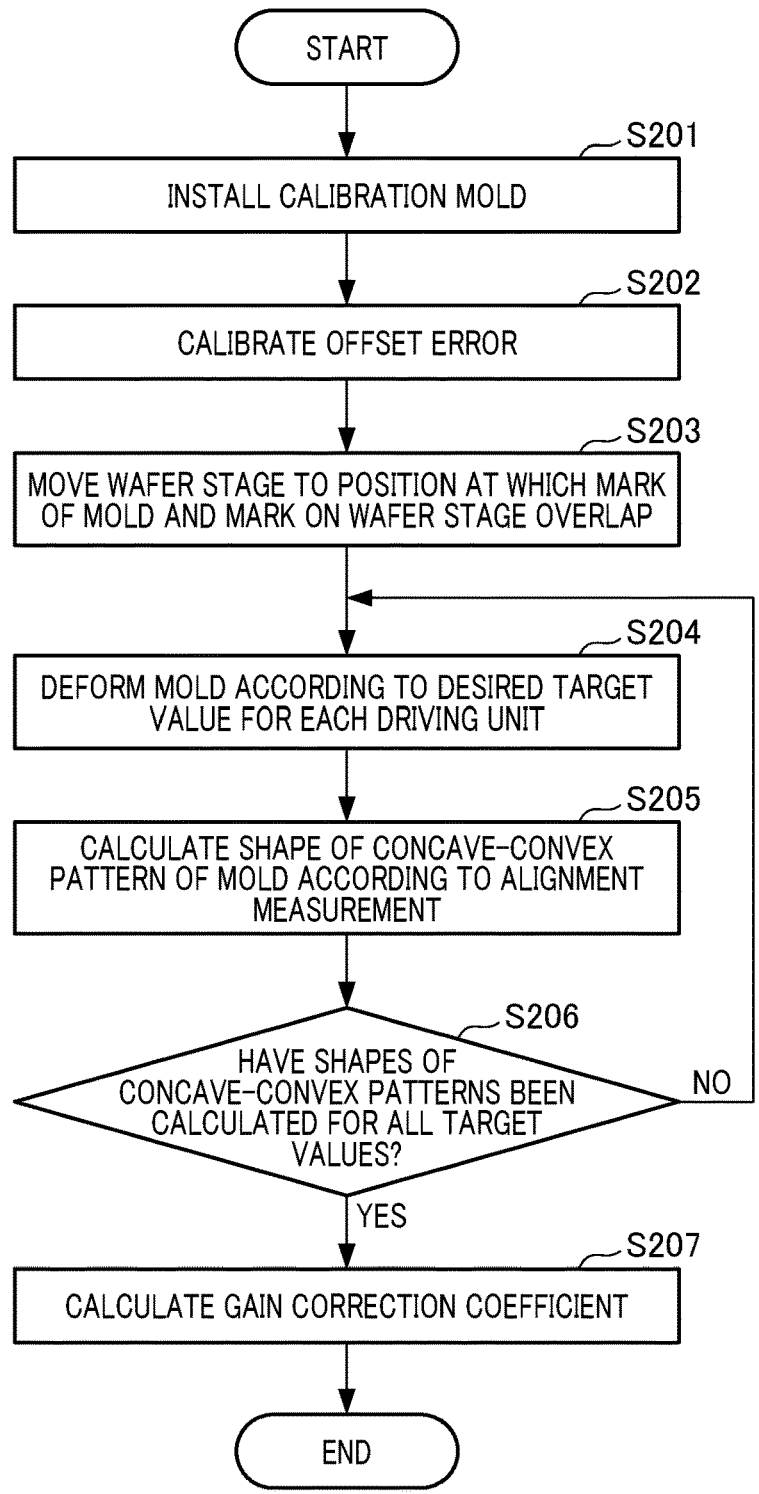
FIG. 5 is a flowchart illustrating a flow of calibration for changes with time of a shape correction mechanism.

FIG. 5 is a flowchart illustrating a flow of a calibration process for changes with time of the shape correction mechanism 5. Also, because the process of steps S201 to S206 after the calibration process for the changes with time in FIG. 5 starts is the same as the process of steps S101 to S106 in FIG. 4 illustrating an initial calibration process described in the first embodiment, description thereof will be omitted.

After completion of step S206, the controller 14 obtains a gain correction coefficient as a second parameter (step S207). At this time, the controller 14 obtains the elements {[f']} of a matrix of a target value of each driving unit 30 by substituting the elements {[r']} of a matrix of an actual deformation amount obtained in alignment measurement in step S205 into the above-described Formula (2). Here, the matrix [A'] serving as the parameter in Formula (2) becomes an invariable parameter by using the alignment mark 22 of the same mold 2 and the reference mark 9 of the wafer stage 8. Thus, a coefficient for which a ratio between the element {[f']} and the element {[f]} is 1 becomes a gain correction coefficient of the sensor 6. Also, if another mold 2 is used when the gain correction coefficient is obtained, the gain correction coefficient is calculated as a value including a difference of the matrix [A']. As a result, improvement of the same degree is obtained for precision of the shape correction, but there is no improvement for the other mold 2. Accordingly, calibration is performed using the same mold 2 as described above, and it is desirable that two parameters, that is, the matrix [A'] and the gain correction coefficient of the sensor 6, be separately managed. In addition, because the gain correction coefficient obtained here is strictly a coefficient including an error factor of a transfer mechanism or the like present in the driving unit 30, the gain correction coefficient is also referred to as a gain correction coefficient in the entire driving unit 30.

Also, when the gain error serving as the linearity error is calibrated, the number of elements of the shape (shape pattern) {[r]} of the concave-convex pattern 21 is sufficient when there are several elements. In particular, it is desirable to use a combination of shape patterns in which measured values of the sensor 6 are significantly different. In addition, when a high-order linearity error is calibrated, it is only necessary to calculate each coefficient using a least squares method or the like by increasing the number of elements of the shape {[r] } of the concave-convex pattern 21 and applying a relation between the element {[f' ] } and the element {[f] } of the matrix of the target value to a high-order approximation function.

Hereinafter, the controller 14 can calibrate the measured value of the sensor 6 if the gain correction coefficient obtained in step S207 is multiplied by the measured value of the sensor 6.

As described above, according to this embodiment, similar effects to the first embodiment are exhibited and calibration precision can be stably maintained, in particular, even when an error due to changes with time related to the sensor 6 occurs.

Also, in the above description, the calibration mold is assumed to be prepared separately from a production mold. However, the calibration mold is not limited to a dedicated mold for calibration as described above. For example, if the initial calibration described in the first embodiment is performed using a specific production mold, a specific production mold may be reused by regarding the specific production mold as a calibration mold at a subsequent calibration time. In this case, because an installation process of the calibration mold in step S201 is unnecessary, a calibration time can be shortened.

In addition, calibration may be performed, for example, after predicting a time at which precision is degraded from an actual value of calibration, as a time at which calibration for changes with time can be performed, the calibration may be performed at the beginning of a production lot, or the calibration may be performed at the timing at which the mold 2 is replaced. Further, one shape of the concave-convex pattern 21 in which a measurement error of the sensor 6 is predicted to be significantly shown may be measured by only an alignment mark of several points, production may continue when the error is within an allowed range of values, and calibration may be configured to be performed when the error exceeds the allowed range of values. In this case, because the calibration time is shortened, it is possible to minimize the degradation of throughput even when a process of checking whether a gain error is within an allowed range of values every time wafer processing is performed is added to the calibration process. In addition, because the calibration time is short for calibration of the offset error, the calibration of the offset error may be frequently performed separately from the calibration of the gain error. For example, the calibration may be performed in parallel with wafer replacement or performed in parallel with coating (supplying) of a resin by the coating unit 10 between shot regions.

(Third Embodiment)

Next, the imprint apparatus according to the third embodiment of the present invention will be described. The imprint apparatus according to this embodiment is characterized in that the mold 2 serving as the production mold is calibrated using the shape correction mechanism 5. Also, because each component of the imprint apparatus according to this embodiment is the same as each component of the imprint apparatus 100 according to the first embodiment, the same reference signs are assigned to the same components and description thereof will be omitted.

Figure 6:
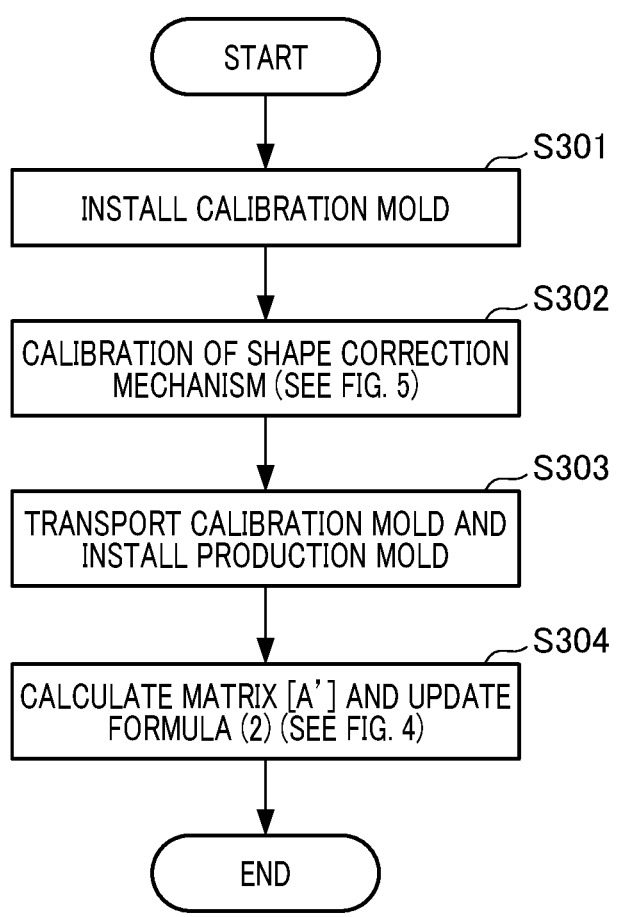
FIG. 6 is a flowchart illustrating a flow of calibration of a production mold.

FIG. 6 is a flowchart illustrating a flow of a calibration process of a production mold. First, the controller 14 installs the calibration mold as the mold 2 in the mold holding mechanism 3 (step S301). Next, the controller 14 performs calibration of the shape correction mechanism 5 along the flow of the flowchart of FIG. 5 described in the second embodiment using the calibration mold (step S302). Next, the controller 14 transports the calibration mold from the mold holding mechanism 3 and continuously installs the production mold as the mold 2 (step S303). Then, the controller 14 can perform the calibration of the production mold by obtaining the matrix [A'] along the flow of the flowchart of FIG. 4 described in the first embodiment using the production mold and updating Formula (2) (step S304).

Also, it is desirable to calibrate the production mold for every type of the mold 2 and manage the matrix [A'] serving as the obtained calibration value in association with the mold 2 serving as a calibration target. In addition, the gain correction coefficient and the offset correction value of the shape correction mechanism 5 are managed separately from the matrix [A'] of the correction parameter due to the mold, so that the matrix [A'] becomes an invariable parameter and it is not necessary to perform calibration thereafter. In addition, even when the shape correction mechanism 5 is replaced, it is possible to maintain calibration precision without depending upon the mold 2 only by performing the calibration described in the second embodiment.

(Article Manufacturing Method)

A method for manufacturing a device (semiconductor integrated circuit element, liquid display element, or the like) as an article may include a step of forming a pattern on a substrate (wafer, glass plate, film-like substrate, or the like) using the imprint apparatus described above. Furthermore, the manufacturing method may include a step of etching the substrate on which a pattern has been formed. When other articles such as a patterned medium (storage medium), an optical element, or the like are manufactured, the manufacturing method may include another step of processing the substrate on which a pattern has been formed instead of the etching step. The device manufacturing method of the present embodiment has an advantage, as compared with a conventional method, in at least one of performance, quality, productivity and production cost of an article.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-235282 filed Nov. 20, 2014, which is hereby incorporated by reference herein in its entirety.

What is claimed is:

1. An imprint apparatus for forming a pattern of an imprint material on a substrate, the imprint apparatus comprising:
   a mold chuck configured to hold a mold;
   a shape corrector including an actuator configured to apply a force to the mold held in the mold chuck;
   a substrate holding unit configured to hold the substrate and including a reference mark;
   a measurement unit configured to measure a relative position between a mark on the mold and the reference mark; and
   a hardware controller configured to execute instructions to:
   cause the shape corrector to physically apply a plurality of target values of the force to a specific mold,
   obtain an actual deformation amount of the specific mold deformed by the shape corrector for each of the plurality of target values of the force physically applied to the specific mold based on a relative position between a mark on the specific mold and the reference mark measured by the measurement unit,
obtain a value of a parameter for associating each of the plurality of target values of the force physically applied to the specific mold and the actual deformation amount of the specific mold for each of the plurality of target values of the force physically applied to the specific mold,
calibrate the shape corrector based on the obtained value of the parameter, and
control the calibrated shape corrector to correct a shape of a pattern formed in a mold to a desired shape before forming the pattern of the imprint material on the substrate using the mold having the desired shape.

2. The imprint apparatus according to claim 1, wherein the specific mold is a calibration mold held in the mold chuck when the shape corrector is calibrated using the parameter.

3. An imprint apparatus for forming a pattern of an imprint material on a substrate, the imprint apparatus comprising:
a mold chuck configured to hold a mold;
a shape corrector including an actuator configured to apply a force to the mold held in the mold chuck;
a detector configured to detect the force applied to the mold or a measured value corresponding to an actual deformation amount of the mold when the force is applied; and
a hardware controller configured to execute instructions to:
cause the shape corrector to physically apply a plurality of target values of the force to a specific mold,
obtain a value of a parameter for associating each of the plurality of target values of the force physically applied to the specific mold and an actual deformation amount of the specific mold for each of the plurality of target values of the force physically applied to the specific mold,
calibrate the shape corrector based on the obtained value of the parameter, and
control the calibrated shape corrector to correct a shape of a pattern formed in a mold to a desired shape before forming the pattern of the imprint material on the substrate using the mold having the desired shape,
wherein the hardware controller obtains the measured value corresponding to the actual deformation amount of the specific mold after driving the shape corrector to be in a non-contact state in which the shape corrector does not contact with the specific mold and after a correction value, for which an output value of the detector becomes zero or matches a reference value in the non-contact state, is calculated and added to the output value.

4. The imprint apparatus according to claim 1, wherein the hardware controller performs the calibration of the shape corrector simultaneously with replacement of the substrate or supplying the imprint material on the substrate.

5. The imprint apparatus according to claim 3, wherein the hardware controller manages the parameter for every type of the mold.

6. An imprint apparatus for forming a pattern of an imprint material on a substrate, the imprint apparatus comprising:
a mold chuck configured to hold a mold;
a shape corrector including an actuator configured to apply a force to the mold held in the mold chuck;
a detector configured to detect the force applied to the mold or a measured value corresponding to an actual deformation amount of the mold when the force is applied; and
a hardware controller configured to execute instructions to:
cause the shape corrector to physically apply a plurality of target values of the force to a specific mold,
obtain a value of a parameter for associating each of the plurality of target values of the force physically applied to the specific mold and an actual deformation amount of the specific mold for each of the plurality of target values of the force physically applied to the specific mold,
calibrate the shape corrector based on the obtained value of the parameter, and
control the calibrated shape corrector to correct a shape of a pattern formed in a mold to a desired shape before forming the pattern of the imprint material on the substrate using the mold having the desired shape,
wherein the hardware controller re-calculates the parameter using the same mold as the specific mold used at the time of calculating the parameter when the calibration of the shape corrector is performed at a desired time interval, calculates a second parameter related to a linearity error or an offset error of the detector based on the re-calculated parameter and calibrates the shape corrector using the second parameter.

7. The imprint apparatus according to claim 6, wherein the second parameter is managed separately from the parameter.

8. A method of calibrating a shape corrector including an actuator configured to apply a force to a mold used to form a pattern of an imprint material on a substrate, the method comprising:
physically applying a plurality of target values of the force to a specific mold using the shape corrector;
obtaining an actual deformation amount of the specific mold deformed by the shape corrector for each of the plurality of target values of the force physically applied to the specific mold based on a relative position between a mark on the specific mold and a reference mark on a substrate holding unit holding the substrate;
obtaining a value of a parameter for associating each of the plurality of target values of the force physically applied to the specific mold and the actual deformation amount of the specific mold for each of the plurality of target values of the force physically applied to the specific mold;
calibrating the shape corrector based on the obtained value of the parameter; and
controlling the calibrated shape corrector to correct a shape of a pattern formed in a mold to a desired shape before forming the pattern of the imprint material on the substrate using the mold having the desired shape.

9. A method of manufacturing an article, the method comprising: performing pattern formation on a substrate using an imprint apparatus; and
processing the substrate on which the pattern formation is performed;
wherein the imprint apparatus includes:
a mold chuck configured to hold a mold;
a shape corrector including an actuator configured to apply a force to the mold held in the mold chuck;
a substrate holding unit configured to hold the substrate and including a reference mark;

a measurement unit configured to measure a relative position between a mark on the mold and the reference mark; and a hardware controller configured to execute instructions to:

cause the shape corrector to physically apply a plurality of target values of the force to a specific mold, obtain an actual deformation amount of the specific mold deformed by the shape corrector for each of the plurality of target values of the force physically applied to the specific mold based on a relative position between a mark on the specific mold and the reference mark measured by the measurement unit, obtain a value of a parameter for associating each of the plurality of target values of the force physically applied to the specific mold and the actual deformation amount of the specific mold for each of the plurality of target values of the force physically applied to the specific mold, calibrate the shape corrector based on the obtained value of the parameter, and control the calibrated shape corrector to correct a shape of a pattern formed in a mold to a desired shape before forming the pattern of the imprint material on the substrate using the mold having the desired shape.

10. A method of manufacturing an article, the method comprising: performing pattern formation on a substrate using a method of calibrating a shape corrector including an actuator configured to apply a force to a mold to correct a shape of a pattern formed in the mold to a desired shape before a pattern of an imprint material is formed on the substrate using the mold; and processing the substrate on which the pattern formation is performed;

wherein the method of calibrating the shape corrector includes:

physically applying a plurality of target values of the force to a specific mold using the shape corrector;

obtaining an actual deformation amount of the specific mold deformed by the shape corrector for each of the plurality of target values of the force physically applied to the specific mold based on a relative position between a mark on the specific mold and a reference mark on a substrate holding unit holding the substrate;

obtaining a value of a parameter for associating each of the plurality of target values of the force physically applied to the specific mold and the actual deformation amount of the specific mold for each of the plurality of target values of the force physically applied to the specific mold;

calibrating the shape corrector based on the obtained value of the parameter; and controlling the calibrated shape corrector to correct the shape of the pattern formed in the mold to the desired shape before forming the pattern of the imprint material on the substrate.

* * * * *